R. SMITH.
RIDING SADDLE.
No. 6,682. Patented Aug. 28, 1849.
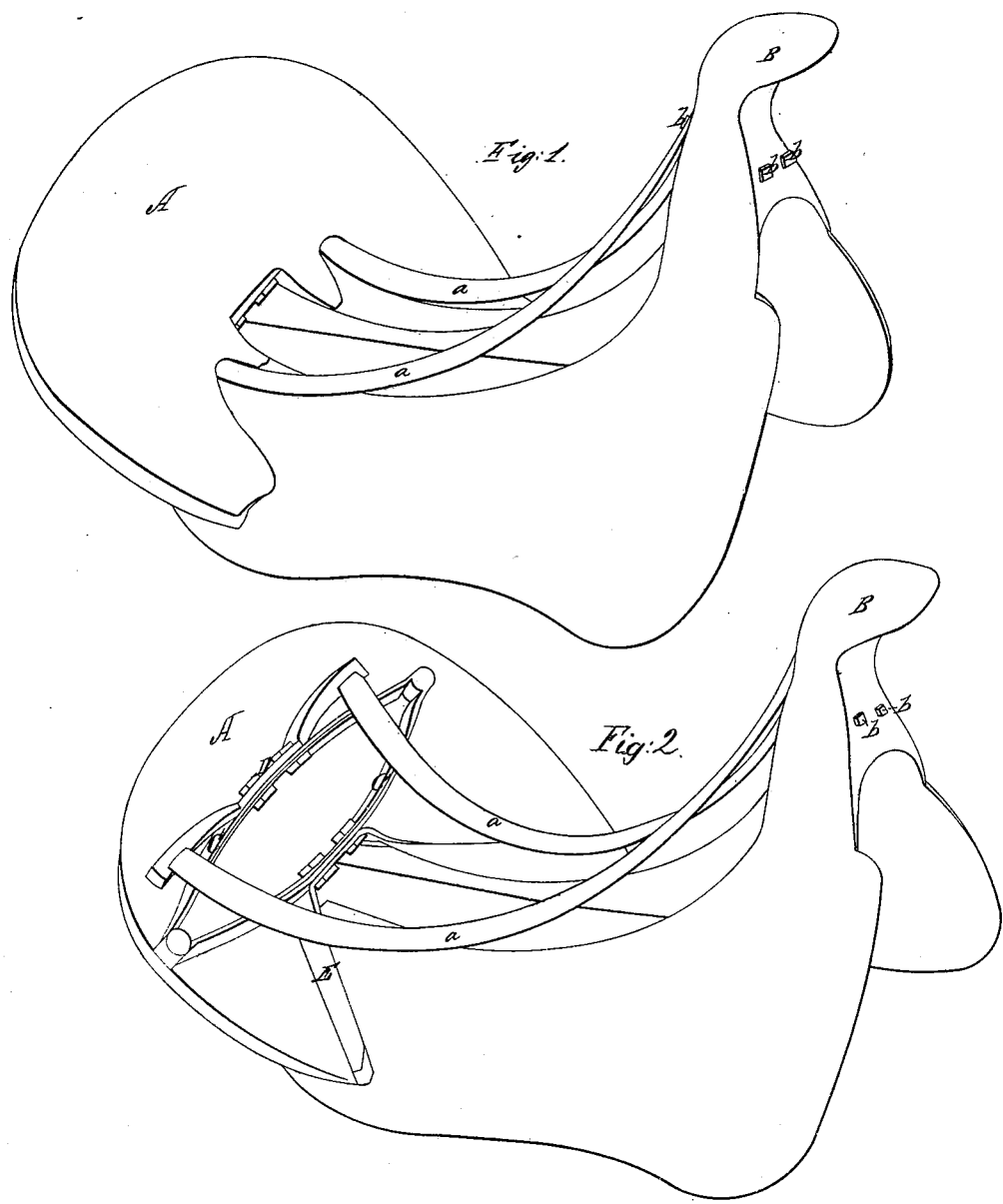

UNITED STATES PATENT OFFICE.

ROBERT SMITH, OF LEESBURG, PENNSYLVANIA.

SPRING-SEAT SADDLE.

Specification of Letters Patent No. 6,682, dated August 28, 1849.

*To all whom it may concern:*

Be it known that I, ROBT. SMITH, of Leesburg, in the county of Cumberland and State of Pennsylvania, have invented a new and useful Improvement in Saddletrees, of which the following is a full, clear, and exact description, reference being had to the accompanying drawing, forming part of this specification, in which—

Figure 1 is a perspective view of my improved saddletree complete, and Fig. 2 a view with the cover of the cantle removed.

The nature of my invention consists in giving great elasticity to the seat of the saddle, by an arrangement of springs attached to the tree; the weight of the rider is sustained on spring steel strips, these are not only elastic in themselves but are rendered additionally so by an elliptic spring concealed in the cantle.

The drawing represents a saddletree of the usual form externally with its cantle A and pommel B. The cantle A has its inner side hollowed and an elliptic spring C is secured to the bridge E of the saddle within this hollow. A spring bar D is attached to the top of the elliptic spring, and is connected with the pommel by curved strips (*a a*) of spring steel; the front ends of the steel strips are firmly secured to the pommel by screw bolts *b b* passing through holes in the extremities of the strips; several holes may be made in the extremities of these strips so as to adjust their length. A covering of raw hide or sheet metal is strained across the cantle to conceal the arrangement of the cantle spring, and protect it from injury, it also prevents the leather of the seat from wear caused by rubbing on the springs. The seat is supported on the steel strips which thus sustain the weight of the rider.

I have described an elliptic cantle spring but it is evident that springs of other forms will produce a good result. It will be perceived that by this arrangement of springs, all straining of the cantle is avoided, as the weight of the rider is sustained on the tree itself through the spring C, and there is no tendency either to draw the cantle toward or force it from the pommel, therefore a saddletree thus constructed possesses all the strength of the tree of an unelastic seat, while at the same time it has the great advantage of relieving the horse, and rendering his motion more easy for the rider.

What I claim as my invention and desire to secure by Letters Patent is—

The combination of the elastic strips (*a a*) for supporting the seat with the spring (C) contained in the cantle of the saddletree, substantially in the manner herein set forth.

ROBERT SMITH.

Witnesses:
JOSIAH HOOD,
JACOB KING.